United States Patent
Tang et al.

(10) Patent No.: US 10,117,140 B2
(45) Date of Patent: *Oct. 30, 2018

(54) NETWORK STORAGE METHOD, SWITCH DEVICE, AND CONTROLLER

(71) Applicant: Huawei Technologies Co., Ltd., Shenzhen (CN)

(72) Inventors: Pengcheng Tang, Shanghai (CN); Konstantinos Pentikousis, Berlin (DE); Wei Zhou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/477,917

(22) Filed: Apr. 3, 2017

(65) Prior Publication Data
US 2017/0208001 A1 Jul. 20, 2017

Related U.S. Application Data

(63) Continuation of application No. 14/670,062, filed on Mar. 26, 2015, now Pat. No. 9,686,724, which is a (Continued)

(51) Int. Cl.
*H04W 36/00* (2009.01)
*H04W 76/36* (2018.01)
(Continued)

(52) U.S. Cl.
CPC ......... *H04W 36/0066* (2013.01); *H04L 45/42* (2013.01); *H04L 45/64* (2013.01);
(Continued)

(58) Field of Classification Search
CPC ..... H04W 36/30; H04W 36/18; H04W 36/04; H04W 90/04; H04W 28/04; H04L 47/20; H04L 47/42; H04L 1/06
See application file for complete search history.

(56) References Cited

U.S. PATENT DOCUMENTS 8,804,490 B2 8/2014 Tatipamula et al.
8,873,398 B2 10/2014 Kempf et al.
(Continued)

FOREIGN PATENT DOCUMENTS

CN 1926540 A 3/2007
CN 1956448 A 5/2007
(Continued)

OTHER PUBLICATIONS

Li, "Simulation Studies of OpenFlow-Based In-Network Caching Strategies," Proceedings of the 15th Communications and Networking Simulation Symposium, Article No. 12, XP055208157, Society for Computer Simulation International, San Diego, California (Mar. 26, 2012).

*Primary Examiner* — Stephen M D Agosta
(74) *Attorney, Agent, or Firm* — Leydig, Voit & Mayer, Ltd.

(57) ABSTRACT

A network storage method, a switch device, and a controller are provided. The method is applicable to a controller based on OpenFlow protocol. The method includes: determining, by the controller, that a first switching equipment is to cache data requested by a first data packet; and notifying, by the controller, the first switching equipment to cache the data requested by the first data packet, and notifying the first switching equipment to establish a first flow table entry according to issued match information corresponding to the first data packet and issued action instruction information corresponding to the first data packet, wherein the action instruction information corresponding to the first data packet is adapted to instruct the first switching equipment to forward the data cached in the first switching equipment and requested by the first data packet.

4 Claims, 4 Drawing Sheets

Related U.S. Application Data continuation of application No. PCT/CN2012/082504, filed on Sep. 29, 2012.

(51) Int. Cl.
*H04L 29/08* (2006.01)
*H04L 12/715* (2013.01)
*H04L 12/717* (2013.01)
*H04L 12/813* (2013.01)
*H04L 12/851* (2013.01)

(52) U.S. Cl.
CPC .......... *H04L 47/20* (2013.01); *H04L 47/2483* (2013.01); *H04L 67/1097* (2013.01); *H04L 67/2842* (2013.01); *H04W 76/36* (2018.02)

(56) References Cited

U.S. PATENT DOCUMENTS

| | | |
|---|---|---|
| 9,148,342 B2 | 9/2015 | Numata et al. |
| 2008/0235360 A1 | 9/2008 | Li et al. |
| 2009/0138577 A1 | 5/2009 | Casado et al. |
| 2011/0261825 A1 | 10/2011 | Ichino |
| 2011/0271007 A1 | 11/2011 | Wang et al. |
| 2011/0310734 A1 | 12/2011 | Mizukoshi |
| 2012/0140637 A1 | 6/2012 | Dudkowski et al. |

FOREIGN PATENT DOCUMENTS

| | | |
|---|---|---|
| CN | 101257485 A | 9/2008 |
| CN | 101860550 A | 10/2010 |
| CN | 102349268 A | 2/2012 |

NETWORK STORAGE METHOD, SWITCH DEVICE, AND CONTROLLER

CROSS-REFERENCE TO RELATED APPLICATIONS

This application is a continuation of U.S. patent application Ser. No. 14/670,062, filed on Mar. 26, 2015, which is a continuation of International Application No. PCT/CN2012/082504, filed on Sep. 29, 2012. All of the afore-mentioned patent applications are hereby incorporated by reference in their entireties.

FIELD OF THE TECHNOLOGY

The present application relates to the field of communication, particularly to a network storage method, switching equipment and a controller.

BACKGROUND

In past few decades, a scale of Internet was expanded rapidly, and network became a necessary part of people's daily life.

In a conventional network structure, after a user initiates a request for an access service, a service request packet initiated by the user will be forwarded by a number of routers distributed in the network to reach a server corresponding to the service request. Every time the service request packet is routed and forwarded, a delay may be caused. In the case that the scale of the network becomes larger and larger, the delay will be more and more severe.

In an existing technology, in order to reduce a delay time of accessing a server by a user, a dedicated cache server may be provided by many content service providers, in a server at an area accessed by users in a high density. The cache server is adapted to cache information such as webpage and files, which is needed by the users. Times that the packet is routed and forwarded may be reduced by providing the dedicated cache server, when the user accesses the server in the high density access area. In this way, times of switching in a network can be reduced, and the delay time of the access of the user can be reduced.

However, due to a large number of users accessing the high density access area, a network load may be increased, causing network congestion. In addition, the server in the high density access area is merely a content node provided by the content service provider. The content node cannot know a topological structure and a load condition of the network. Therefore, when the user accesses the server in the high density access area, a routing will be selected in a low flexibility.

SUMMARY

A network storage method based on OpenFlow, switching equipment and a controller are provided according to embodiments of the application, to improve a speed of a user accessing network data, and ease the network congestion to some extent.

To achieve the above purposes, technical solutions as follows are adopted in the embodiments of the application.

In a first aspect, a network storage method is provided, which is applicable to a controller based on OpenFlow protocol. The method includes:

determining, by the controller, that a first switching equipment is to cache data requested by a first data packet; and notifying, by the controller, the first switching equipment to cache the data requested by the first data packet, and notifying the first switching equipment to establish a first flow table entry according to issued match information corresponding to the first data packet and action instruction information corresponding to the first data packet, where the action instruction information corresponding to the first data packet is adapted to instruct the first switching equipment to forward the data cached in the first switching equipment and requested by the first data packet.

In a first possible implementation, according to the first aspect, before the determining, by the controller, that a first switching equipment is to cache data requested by a first data packet, the method further includes:

receiving, by the controller, the first data packet forwarded by the first switching equipment; and the determining, by the controller, that a first switching equipment is to cache data requested by a first data packet, includes:

determining, by the controller, that the first switching equipment is to cache the data requested by the first data packet, according to a cache policy corresponding to the first data packet, where the cache policy is pre-configured in the controller or is acquired from a policy and charging control PCC device.

In a second possible implementation, according to the first aspect or the first possible implementation, the method further includes:

receiving, by the controller, a second data packet forwarded by a second switching equipment; and notifying, by the controller, the second switching equipment to forward the second data packet to the first switching equipment, in a case that data requested by the second data packet is the same as the data requested by the first data packet.

In a third possible implementation, according to the second possible implementation, after the receiving, by the controller, a second data packet forwarded by a second switching equipment, the method further includes:

notifying, by the controller, the second switching equipment to cache the data requested by the second data packet, and notifying the second switching equipment to establish a second flow table entry according to match information corresponding to the issued second data packet and action instruction information corresponding to the second data packet, where the action instruction information corresponding to the second data packet is adapted to instruct the second switching equipment to forward the data cached in the second switching equipment and requested by the second data packet.

In a second aspect, another network storage method is provided, which is applicable to a controller based on OpenFlow protocol. The method includes:

receiving, by the first switching equipment, a first notification from the controller, where the first notification is adapted to instruct the first switching equipment to cache data requested by a first data packet, and instruct the first switching equipment to establish a first flow table entry according to issued match information corresponding to the first data packet and action instruction information corresponding to the first data packet, and where the action instruction information corresponding to the first data packet is adapted to instruct the first switching equipment to forward the data cached in the first switching equipment and requested by the first data packet;

establishing, by the first switching equipment, the first flow table entry according to the match information corresponding to the first data packet and the action instruction information corresponding to the first data packet, where the match information and the action instruction information are issued by the controller;

forwarding, by the first switching equipment, the first data packet to a target network element corresponding to the first data packet;

receiving, by the first switching equipment, data corresponding to the first data packet, where the data is returned by the target network element corresponding to the first data packet; and caching, by the first switching equipment, the received data corresponding to the first data packet.

In a first possible implementation, according to the second aspect, before the receiving, by the first switching equipment, a first notification from a controller, the method further includes:

receiving, by the first switching equipment, the first data packet; and forwarding, by the first switching equipment, the first data packet to the controller, in a case that a flow table entry corresponding to the first data packet does not exist in the first switching equipment.

In a second possible implementation, according to the second aspect or the first possible implementation, the method further includes:

receiving, by the first switching equipment, a second data packet sent by a network device; and forwarding, by the first switching equipment, cached data corresponding to the second data packet to the network device, in a case that a flow table entry corresponding to the second data packet exists in the first switching equipment.

In a third possible implementation, according to the second possible implementation, after the receiving, by the first switching equipment, a second data packet sent by a network device, the method further includes:

sending, by the first switching equipment, the second data packet to the controller, in a case that the flow table entry corresponding to the second data packet does not exist in the first switching equipment;

receiving, by the first switching equipment, a second notification from the controller, where the second notification is adapted to instruct the first switching equipment to forward the second data packet to a second switching equipment, and where data corresponding to the second data packet is cached in the second switching equipment;

sending, by the first switching equipment, the second data packet to the second switching equipment according to the second notification;

receiving, by the first switching equipment, the data corresponding to the second data packet and sent by the second switching equipment; and forwarding, by the first switching equipment, to the network device the received data corresponding to the second data packet.

In a fourth possible implementation, according to the third possible implementation, the second notification is further adapted to instruct the first switching equipment to cache data requested by the second data packet, and establish a third flow table entry according to match information corresponding to the second data packet and action instruction information corresponding to the second data packet, where the action instruction information corresponding to the second data packet is adapted to instruct the second switching equipment to forward the data cached in the second switching equipment and requested by the second data packet;

after the receiving, by the first switching equipment, the data corresponding to the second data packet and sent by the second switching equipment, the method further includes:

caching, by the first switching equipment, the data corresponding to the second data packet.

In a third aspect, a controller is provided, which includes:

a processor and a sender;

the processor is adapted to determine that a first switching equipment is to cache data requested by a first data packet, and send to the sender a determined message that the first switching equipment is to cache data requested by a first data packet;

the sender is adapted to receive from the process the message that the first switching equipment is to cache the data requested by the first data packet; notify the first switching equipment to cache the data requested by the first data packet; and notify the first switching equipment to establish a first flow table entry according to issued match information corresponding to the first data packet and issued action instruction information corresponding to the first data packet, where the action instruction information corresponding to the first data packet is adapted to instruct the first switching equipment to forward the data cached in the first switching equipment and requested by the first data packet.

In a first possible implementation, according to the third aspect, the controller further includes a receiver; where the receiver is adapted to receive the first data packet forwarded by the first switching equipment and send the first data packet to the processor, before the controller determines that the first switching equipment is to cache the data requested by the first data packet;

the controller adapted to determine that a first switching equipment is to cache data requested by a first data packet, including determining, by the controller, that the first switching equipment is to cache data requested by a first data packet, according to a cache policy corresponding to the first data packet, where the cache policy is preconfigured in the controller or is acquired from a policy and charging control PCC device.

In a second possible implementation, according to the third aspect or the first possible implementation, the receiver is further adapted to receive a second data packet forwarded by a second switching equipment; and the receiver is further adapted to notify the second switching equipment to forward the second data packet to the first switching equipment, in a case that data requested by the second data packet is the same as the data requested by the first data packet.

In a third possible implementation, according to the second possible implementation, after the receiver receives the second data packet forwarded by the second switching equipment, the sender is further adapted to notify the second switching equipment to cache the data requested by the second data packet, and notify the second switching equipment to establish a second flow table entry according to issued match information corresponding to the second data packet and issued action instruction information corresponding to the second data packet, where the action instruction information corresponding to the second data packet is adapted to instruct the second switching equipment to forward the data cached in the second switching equipment and requested by the second data packet.

In a fourth aspect, a first switching equipment is provided, which is based on the OpenFlow protocol. The first switching equipment includes: a receiver, a processor, a sender and a memory.

the receiver is adapted to receive a first notification from a controller, and send the first notification to the processor, where the first notification is adapted to instruct the first switching equipment to cache data requested by a first data packet, and instruct the first switching equipment to establish a first flow table entry according to issued match information corresponding to the first data packet and issued action instruction information corresponding to the first data packet, and where the action instruction information corresponding to the first data packet is adapted to instruct the first switching equipment to forward the data cached in the first switching equipment and requested by the first data packet;

the processor is adapted to receive the first notification sent by the receiver, and establish the first flow table entry according to the match information corresponding to the first data packet and the action instruction information corresponding to the first data packet, where the match information and the action instruction information are issued by the controller;

the sender is adapted to forward the first data packet to a target network element corresponding to the first data packet;

the receiver is further adapted to receive data corresponding to the first data packet, where the data corresponding to the first data packet is returned by the target network element corresponding to the first data packet; and send the data corresponding to the first data packet to the memory; and the memory is adapted to receive the data corresponding to the first data packet and cache the received data corresponding to the first data packet.

In a first possible implementation, according to the fourth aspect, before receiving a first notification from a controller, the receiver is further adapted to receive the first data packet; and the sender is further adapted to forward the first data packet to the controller, in a case that a flow table entry corresponding to the first data packet does not exist in the first switching equipment.

In a second possible implementation, according to the fourth aspect or the first possible implementation, the receiver is further adapted to receive a second data packet sent by a network device; and the sender is further adapted to forward to the network device cached data corresponding to the second data packet, in a case that a flow table entry corresponding to the second data packet is in the first switching equipment.

In a third possible implementation, according to the second possible implementation, after the receiver receives the second data packet sent by the network device, the sender is further adapted to send the second data packet to the controller, in a case that a flow table entry corresponding to the second data packet is not in the first switching equipment;

the receiver is further adapted to receive a second notification from the controller, and send the second notification to the sender, where the second notification is adapted to instruct the first switching equipment to forward the second data packet to a second switching equipment, where data corresponding to the second data packet is cached in the second switching equipment;

the sender is further adapted to receive the second notification sent by the receiver, and send the second data packet to the second switching equipment according to the second notification.

The receiver is further adapted to receive the data corresponding to the second data packet and sent by the second switching equipment, and send to the sender the data corresponding to the second data packet; and the sender is further adapted to receive the data corresponding to the second data packet and sent by the receiver, and forward the received data corresponding to the second data packet to the network device.

In a fourth possible implementation, according to the third possible implementation, the second notification is further adapted to instruct the first switching equipment to cache data requested by the second data packet, and instruct the first switching equipment to establish a third flow table entry according to match information corresponding to the second data packet and action instruction information corresponding to the second data packet, where the action instruction information corresponding to the second data packet is adapted to instruct the second switching equipment to forward the data cached in the second switching equipment and requested by the second data packet; and the memory is further adapted to cache the data corresponding to the second data packet, after the receiver receives the data corresponding to the second data packet and sent by the second switching equipment.

A network storage method, a controller and a switching equipment are provided according to embodiments of the application. The method includes: after determining that a first switching equipment is to cache data requested by a first data packet, the controller notifies the first switching equipment to cache the data requested by the first data packet, and notifies the first switching equipment to establish a first flow table entry according to issued match information corresponding to the first data packet and issued action instruction information corresponding to the first data packet. Thus, after receiving a notification from the controller, the first switching equipment establishes the first flow table entry according to the match information corresponding to the first data packet and the action instruction information corresponding to the first data packet, where the match information and the action instruction information are issued by the controller; the first switching equipment forwards the first data packet to a target network element corresponding to the first data packet; after the target network element sends the data corresponding to the first data packet to the first switching equipment, the first switching equipment caches the received data corresponding to the first data packet. In this way, because the data corresponding to the first data packet are cached in the first switching equipment, the first switching equipment can directly send the data to the user, rather than obtaining the data from a server corresponding to the first data packet through multiple times of routing, when a user requests the data corresponding to the first data packet. Therefore, a speed of the user accessing network data is improved, and the network congestion can be eased to some extent.

BRIEF DESCRIPTION OF THE DRAWINGS

For clarity of description of the technical solutions in embodiments of the application or in the existing technology, drawings for description of the embodiments or prior art are introduced below briefly. Apparently, the drawings described below are merely a few embodiments of the application. For those skilled in the art, other drawings may be obtained according to these drawings without paying any creative work.

DETAILED DESCRIPTION OF EMBODIMENTS

The technical solutions in embodiments of the application are clearly and completely described below in combination with the drawings in the embodiments of the application. Apparently, the described embodiments are merely a few instead of all embodiments of the application. Based on the embodiments of the application, all other embodiments obtained by those skilled in the art without creative work are within the scope of the application A conventional network composed of fixed physical hardware is transformed into a dynamic variable software defined network (SDN) by OpenFlow protocol. OpenFlow protocol is a protocol having open interfaces, which can realize a separation of a control plane and a forwarding plane.

A network based on OpenFlow protocol includes a controller based on OpenFlow protocol and a switching equipment based on OpenFlow protocol. The controller manages the switching equipment connected therewith. For example, the controller manages a creation of a new flow table, and an updating, deletion and query of a flow table in the switching equipment. The switching equipment is adapted to route and forward data packages in the network.

A protocol of a switching equipment based on OpenFlow protocol includes: flow table, secure channel and OpenFlow protocol. The switching equipment is connected with the controller via the secure channel. The flow table is a kernel data structure, adapted to perform a forwarding policy control by the switching equipment. A switching chip determines an action to be taken on network flow entering the switching equipment, by querying the flow table. The flow table includes: a match fields, a counter and an action set. Various providers may design various flow tables according to their own requirements. The counter of the flow table counts information of traffic, such as active entries of the flow table, times of query, and times of sending packets. The counter of the flow table can be maintained according to each flow table, each flow, each port, or each queue. The action set of the flow table includes actions which can be performed by the flow table.

First, it is noted that a first switching equipment or a first domain name has no particular meaning, but merely for convenience of description, which can indicates any switching equipment or any domain name.

First Embodiment

Figure 1:
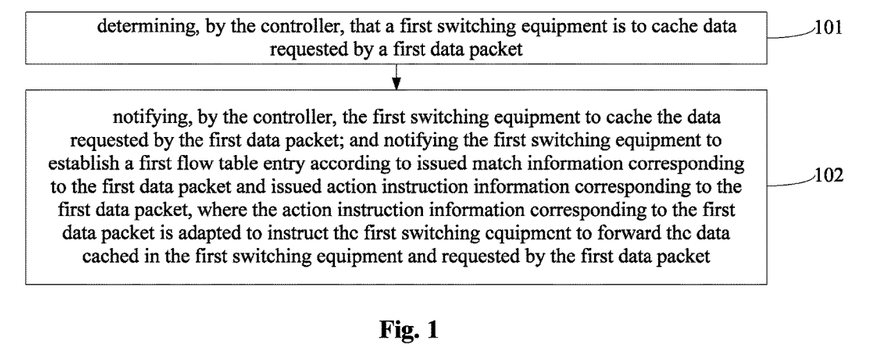
FIG. 1 is a flow chart of a network storage method according to an embodiment of the application.

A network storage method is provided according to the embodiment of the application. The method is applicable to a controller based on OpenFlow protocol, as shown in FIG. 1. The method includes:

101 includes: determining, by the controller, that a first switching equipment is to cache data requested by a first data packet.

The controller determines whether the data requested by the first data packet are to be cached into the first switching equipment, according to a predetermined cache policy. The cache policy is pre-configured in the controller, or is acquired from a policy and charging control PCC device. For example, when the user requests an access of a data packet corresponding to a first domain name multiple times through the first switching equipment, the first switching equipment sends the packet to the controller, and then the controller determines that data corresponding to a first domain name are hot data. In order to avoid repeatedly acquiring the data corresponding to the first domain name from a network side, the controller may determine that the data corresponding to the first domain name is to be stored in the first switching equipment, according to a type and characteristics of data cached in the switching equipment managed by the controller.

Certainly, the predetermined cache policy varies with conditions. For example, the controller may decide, according to a requirement of a content service provider, that the data corresponding to the first domain name is to be cached in the first switching equipment. A type of the policy, according to which the controller decides that the data corresponding to the first domain name is to be cached in the first switching equipment, is not particularly limited in the embodiment of the application.

102 includes: notifying, by the controller, the first switching equipment to cache the data requested by the first data packet, and notifying the first switching equipment to establish a first flow table entry according to issued match information corresponding to the first data packet and issued action instruction information corresponding to the first data packet, where the action instruction information corresponding to the first data packet is adapted to instruct the first switching equipment to forward the data cached in the first switching equipment and requested by the first data packet.

The controller may send a flow table establishment instruction message to the first switching equipment. The flow table establishment instruction message is adapted to instruct the first switching equipment to establish the first flow table entry according to the match information corresponding to the first data packet and the action instruction information corresponding to the first data packet, where the match information and the action instruction information are carried in the flow table establishment instruction message. In addition, the flow table establishment instruction message is also adapted to instruct the first switching equipment to cache the data requested by the first data packet.

The controller may also send a first instruction message to the first switching equipment, to instruct the first switching equipment to cache the data requested by the first data packet. In addition, the controller may send a flow table establishment instruction message, adapted to instruct the first switching equipment to establish the first flow table entry according to the match information corresponding to the first data packet and the action instruction information corresponding to the first data packet, where the match information and the action instruction information are carried in the flow table establishment instruction message.

After the controller determines the data requested by the first data packet to be cached into the first switching equipment, an interaction between the controller and the first switching equipment is not particularly limited in the embodiment. A final result of the interaction is adapted to establish the flow table entry, and instruct the first switching equipment to cache the data requested by the first data packet. In this way, a network device may acquire the data corresponding to the first data packet from the first switching equipment directly.

Figure 2:
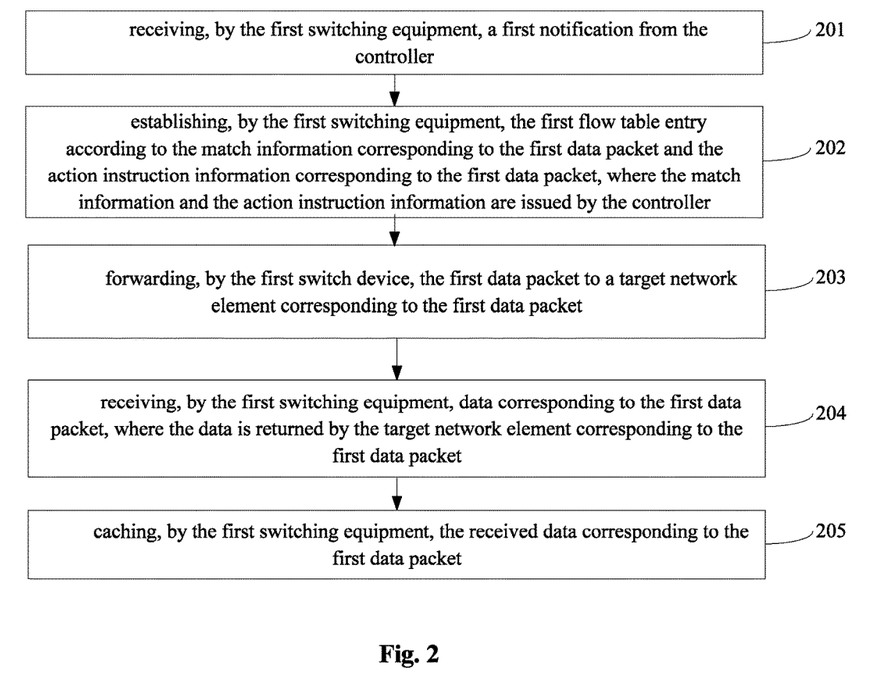
FIG. 2 is a flow chart of another network storage method according to an embodiment of the application.

Another network storage method is provided according to the embodiment of the application, which is applicable to a controller based on OpenFlow protocol, as shown in FIG. 2. The method includes:

201 includes: receiving, by the first switching equipment, a first notification from the controller, where the first notification is adapted to instruct the first switching equipment to cache data requested by a first data packet, and instruct the first switching equipment to establish a first flow table entry according to issued match information corresponding to the first data packet and issued action instruction information corresponding to the first data packet, and where the action instruction information corresponding to the first data packet is adapted to instruct the first switching equipment to forward the data cached in the first switching equipment and requested by the first data packet.

The first switching equipment receives a first notification sent by the controller, when the controller determines that the data requested by the first data packet are to be cached into the first switching equipment according to a predetermined cache policy.

For example, when the user requests an access of data corresponding to a first data packet multiple times through a first switching equipment, the first switching equipment sends the packet to the controller, and then the controller determines that the data corresponding to the first domain name are hot data. In order to avoid repeatedly acquiring the data corresponding to the first domain name from a network side, the controller may determine that the data corresponding to the first domain name is to be stored in the first switching equipment, according to a type and characteristics of data cached in the switching equipment managed by the controller.

Certainly, the predetermined cache policy varies with conditions. For example, the controller may decide, according to requirement of a content service provider, that the data corresponding to the first domain name are to be cached in the first switching equipment. A type of the policy, according to which the controller decides that the data corresponding to the first domain name is to be cached in the first switching equipment, is not particularly limited in the embodiment of the application.

It is noted that the first notification is merely a reference different from a second notification, which is merely to explain that the first notification and the second notification are different notifications issued by the controller.

202 includes: establishing, by the first switching equipment, the first flow table entry according to the match information corresponding to the first data packet and the action instruction information corresponding to the first data packet, where the match information and the action instruction information are issued by the controller.

203 includes: forwarding, by the first switching equipment, the first data packet to a target network element corresponding to the first data packet.

The data requested by the first data packet are stored in the target network element. The target network element may be a subscriber server, or any other switching equipment managed by the controller, which is not limited in the embodiment of the application.

204 includes: receiving, by the first switching equipment, data corresponding to the first data packet, where the data is returned by the target network element corresponding to the first data packet.

205 includes: caching, by the first switching equipment, the received data corresponding to the first data packet.

The first switching equipment caches the received data corresponding to the first data packet. Thus, a network device can acquire the data corresponding to the first data packet directly from the first switching equipment. Therefore, a speed of the user accessing a network is improved, and the network congestion is reduced.

A network storage method is provided in the embodiment of the application. The method includes: after determining that a first switching equipment is to cache data requested by a first data packet, the controller notifies the first switching equipment to cache the data requested by the first data packet, and notifies the first switching equipment to establish a first flow table entry according to issued match information corresponding to the first data packet and issued action instruction information corresponding to the first data packet. Thus, after receiving a notification from the controller, the first switching equipment establishes the first flow table entry according to the match information corresponding to the first data packet and the action instruction information corresponding to the first data packet, where the match information and the action instruction information are issued by the controller; the first switching equipment forwards the first data packet to a target network element corresponding to the first data packet; after the target network element sends the data corresponding to the first data packet to the first switching equipment, the first switching equipment caches the received data corresponding to the first data packet. In this way, because the data corresponding to the first data packet are cached in the first switching equipment, the first switching equipment can directly send the data to the user, rather than obtaining the data from a server corresponding to the first data packet through multiple times of routing, when a user requests the data corresponding to the first data packet. Therefore, a speed of the user accessing network data is improved, and the network congestion can be eased to some extent.

Second Embodiment

Figure 3:
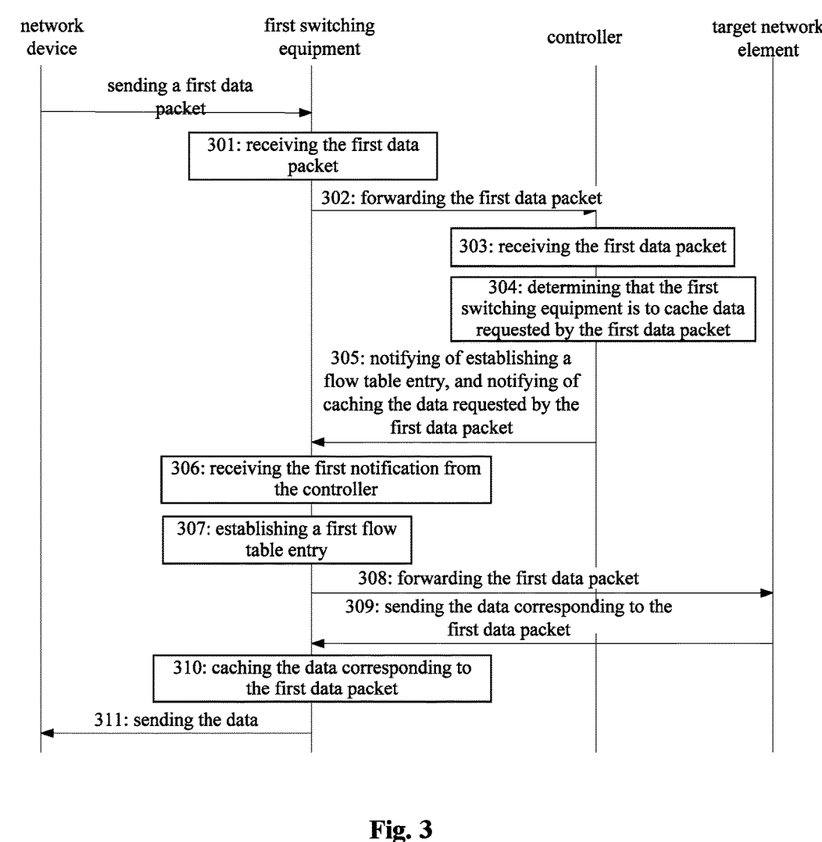
FIG. 3 is a flow chart of further another network storage method according to an embodiment of the application.

A network storage method is provided according to the embodiment of the application. The method is applicable to a controller based on OpenFlow protocol and to a first switching equipment based on OpenFlow protocol, where the first switching equipment is connected with the controller, as shown in FIG. 3. The method includes:

301 includes: receiving, by the first switching equipment, a first data packet initiated by a network device.

After receiving the first data packet initiated by the network device, the first switching equipment matches the first data packet to a match field of a flow table entry. If there is match information, it means that a flow table entry corresponding to the first data packet exists in the first switching equipment. In this case, data in the first switching equipment and requested by the first data packet is sent to the network device.

If there is no match information, it means that flow table entry corresponding to the first data packet does not exist in the first switching equipment. In this case, step 302 is performed.

The step 302 includes: forwarding, by the first switching equipment, the first data packet to the controller, in the case that the flow table entry corresponding to the first data packet does not exist in the first switching equipment.

Because the flow table entry corresponding to the first data packet does not exist in the first switching equipment, the first switching equipment forwards the first data packet to the controller, and the controller processes the data packet, such as whether to select an appropriate routing path for the data request packet, or to determining whether the data requested by the first data packet are to be cached in the first switching equipment.

303 includes: receiving, by the controller, the first data packet forwarded by the first switching equipment.

304 includes: determining, by the controller, that the first switching equipment is to cache data requested by a first data packet.

The controller determines whether the data requested by the first data packet are to be cached into the first switching equipment, according to a predetermined cache policy. The cache policy is pre-configured in the controller or is acquired from a policy and charging control PCC device. For example, when the user requests an access of a data packet corresponding to a first domain name multiple times through a first switching equipment, the first switching equipment sends the packet to the controller, and then the controller determines the data corresponding to the first domain name are hot data. In order to avoid repeatedly acquiring the data corresponding to the first domain name from a network side, the controller may determine that the data corresponding to the first domain name is to be stored in the first switching equipment, according to a type and characteristics of data cached in the switching equipment managed by the controller.

Certainly, the predetermined cache policy varies with conditions. For example, the controller may decide, according to a requirement of a content service provider, that the data corresponding to the first domain name is to be cached in the first switching equipment. A type of the policy, according to which the controller decides that the data corresponding to the first domain name are to be cached in the first switching equipment, is not particularly limited in the embodiment of the application.

305 includes: notifying, by the controller, the first switching equipment to cache the data requested by the first data packet; and notifying the first switching equipment to establish a first flow table entry according to issued match information corresponding to the first data packet and issued action instruction information corresponding to the first data packet, where the action instruction information corresponding to the first data packet is adapted to instruct the first switching equipment to forward the data cached in the first switching equipment and requested by the first data packet.

The controller may send a flow table establishment instruction message to the first switching equipment. The flow table establishment instruction message is adapted to instruct the first switching equipment to establish the first flow table entry according to the match information corresponding to the first data packet and the action instruction information corresponding to the first data packet, where the match information and the action instruction information are carried by the flow table establishment instruction message. In addition, the flow table establishment instruction message is also adapted to instruct the first switching equipment to cache the data requested by the first data packet.

The controller may also send a first instruction message to the first switching equipment, to instruct the first switching equipment to cache the data requested by the first data packet. In addition, the controller may send a flow table establishment instruction message, adapted to instruct the first switching equipment to establish the first flow table entry according to the match information corresponding to the first data packet and the action instruction information corresponding to the first data packet, where the match information and the action instruction information are carried by the flow table establishment instruction message.

After the controller determines the data requested by the first data packet to be cached into the first switching equipment, an interaction between the controller and the first switching equipment is not particularly limited in the embodiment. A final result of the interactions is adapted to establish a first flow table entry, and instruct the first switching equipment to cache the data requested by the first data packet. Thus, the network device may acquire the data corresponding to the first data packet directly from the first switching equipment.

306 includes: receiving, by the first switching equipment, a first notification from the controller.

The first switching equipment receives a first notification from the controller, in the case that the controller determines, according to a predetermined cache policy, data requested by the first data packet to be cached into a first switching equipment. The first notification is adapted to instruct the first switching equipment to cache data requested by a first data packet, and instruct the first switching equipment to establish a first flow table entry according to issued match information corresponding to the first data packet and action instruction information corresponding to the first data packet. The action instruction information corresponding to the first data packet is adapted to instruct the first switching equipment to forward the data cached in the first switching equipment and requested by the first data packet.

It is noted that the first notification is merely a reference different from a second notification, which is merely to explain that the first notification and the second notification are different notifications issued by the controller.

307 includes: establishing, by the first switching equipment, the first flow table entry, according to the match information corresponding to the first data packet and the action instruction information corresponding to the first data packet, where the match information and the action instruction information are issued by the controller.

308 includes: forwarding, by the first switching equipment, the first data packet to a target network element corresponding to the first data packet.

309 includes: receiving, by the first switching equipment, data corresponding to the first data packet, where the data is returned by the target network element corresponding to the first data packet.

The data corresponding to the first data packet is stored in the target network element. The target network element may be a subscriber server, or may also be any other switching equipment managed by the controller, which is not particularly limited in the embodiment of the application.

310 includes: caching, by the first switching equipment, the received data corresponding to the first data packet.

311 includes: forwarding, by the first switching equipment, to the network device the cached data corresponding to the first data packet.

The first switching equipment caches the received data corresponding to the first data packet. Thus, a network device can acquire the data corresponding to the first data packet directly from the first switching equipment. Therefore, a speed of the user accessing a network is improved, and the network congestion is reduced.

Figure 4:
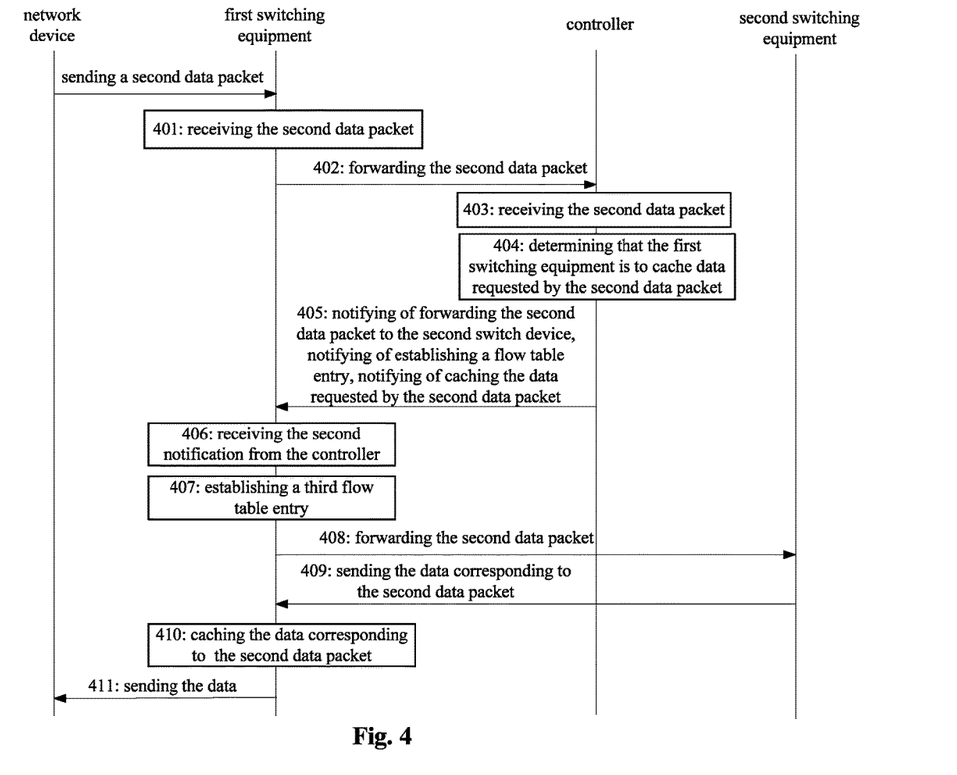
FIG. 4 is a flow chart of yet another network storage method according to an embodiment of the application.

Further, the target network element may be switching equipment managed by the controller. In this case, after receiving a second data packet, the first switching equipment forwards the second data packet to the controller, a notification sent from the controller to the first switching equipment is further adapted to instruct the first switching equipment to send the second data packet to a second switching equipment. That is because data requested by the second data packet does not exist in the first switching equipment. The data requested by the second data packet are cached in the second switching equipment. The above process is shown in FIG. 4, which includes:

401 includes: receiving, by the first switching equipment, a second data packet initiated by a network device.

402 includes: forwarding, by the first switching equipment, the second data packet to the controller, in the case that flow table entry corresponding to the second data packet does not exist in the first switching equipment.

403 includes: receiving, by the controller, the second data packet forwarded by the first switching equipment.

404 includes: determining, by the controller, that the first switching equipment is to be cache data requested by a second data packet.

405 includes: notifying, by the controller, the first switching equipment to forward the data packet to the second switching equipment, notifying the first switching equipment to cache data requested by the second data packet, and notifying the first switching equipment to establish a third flow table entry according to match information corresponding to the second data packet and action instruction information corresponding to the second data packet, where the action instruction information corresponding to the second data packet is adapted to instruct the first switching equipment to forward the data cached in the first switching equipment and requested by the second data packet.

406 includes: receiving, by the first switching equipment, a second notification from the controller.

407 includes: establishing, by the first switching equipment, the third flow table entry according to the match information corresponding to the second data packet and the action instruction information corresponding to the second data packet, where the match information and the action instruction information are issued by the controller.

408 includes: forwarding, by the first switching equipment, the second data packet to the second switching equipment according to the second notification.

409 includes: receiving, by the first switching equipment, data corresponding to the second data packet, where the data is returned by the second switching equipment.

410 includes: caching, by the first switching equipment, the received data corresponding to the second data packet.

Step 411 includes: forwarding, by the first switching equipment, to the network device the cached data corresponding to the second data packet.

The process shown in FIG. 4 differs from the process shown in FIG. 3 in that the second switching equipment managed by the controller in FIG. 4 embodies the target network element in FIG. 3, a data packet received by the first switching equipment is the second data packet, and the controller notifying the first switching equipment to forward the second data packet to the second switching equipment after determining that the data requested by the second data packet are to be cached in the first switching equipment. The first data packet and the second data packet are both refer to received data packets. The first and the second are merely to distinguish different data packets. Therefore, the detailed description for the steps 401-411 can refer to the steps 301-311.

Thus, the controller provides an optimized routing path to the first switching equipment, to improve a speed of the network device accessing the data. In addition, because the data corresponding to the second data packet are cached in the first switching equipment, the first switching equipment can directly send the data to the network device, rather than obtaining the data from a server corresponding to the second data packet through multiple times of routing, when the network device requests the data corresponding to the second data packet. Thereby, a speed of the user accessing network data is improved, and the network congestion is eased to some extent.

Certainly, in the above process, the first switching equipment may determine, according to a cache policy of the controller, that the data requested by the second data packet is not cached. Thus, the step 404 is modified, and the modified step 4 includes: determining that the first switching equipment is not to be cache data requested by the second data packet. In 405, the controller notifies only the first switching equipment to forward the second data packet to the second switching equipment. Correspondingly, there is no process of establishing the third flow table entry in the step 407, and there is no process of caching the data corresponding to the first data packet in the step 410. Instead, after receiving the data corresponding to the second data packet and sent by the second switching equipment, the first switching equipment directly forwards the data corresponding to the second data packet to the network device.

Whether the first switching equipment stores the data corresponding to the second data packet is determined according to the cache policy of the controller, which will not be limited in the embodiment of the application.

A network storage method is provided in an embodiment of the application. The method includes: after determining that a first switching equipment is to cache data requested by a first data packet, the controller notifies the first switching equipment to cache the data requested by the first data packet, and notifies the first switching equipment to establish a first flow table entry according to issued match information corresponding to the first data packet and issued action instruction information corresponding to the first data packet. Thus, after receiving a notification from the controller, the first switching equipment establishes the first flow table entry according to the match information corresponding to the first data packet and the action instruction information corresponding to the first data packet, where the match information and the action instruction information are issued by the controller; the first switching equipment forwards the first data packet to a target network element corresponding to the first data packet; after the target network element sends the data corresponding to the first data packet to the first switching equipment, the first switching equipment caches the received data corresponding to the first data packet. In this way, because the data corresponding to the first data packet are cached in the first switching equipment, the first switching equipment can directly send the data to the user, rather than obtaining the data from a server corresponding to the first data packet through multiple times of routing, when a user requests the data corresponding to the first data packet. Therefore, a speed of the user accessing network data is improved, and the network congestion can be eased to some extent.

Third Embodiment

Figure 5:
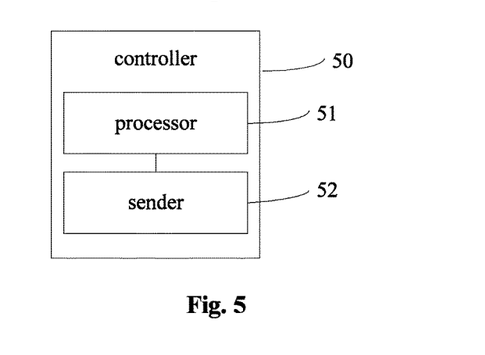
FIG. 5 is a structural diagram of a controller according to an embodiment of the application.

A controller 50 is further provided in the embodiment of the application, which is based on OpenFlow protocol. As shown in FIG. 5, the controller 50 includes: a processor 51 and a sender 52.

The processor 51 is adapted to determine that a first switching equipment is to cache data requested by a first data packet, and send to the sender 52 a determined message that the first switching equipment is to cache the data requested by the first data packet.

The processor 51 determines whether the data requested by the first data packet is to be cached into the first switching equipment, according to a predetermined cache policy. The cache policy is pre-configured in the processor, or is acquired from a policy and charging control PCC device. For example, when the user requests an access of a data packet corresponding to a first domain name multiple times through a first switching equipment, the first switching equipment sends the packet to the processor 51 of the controller 50, and then the processor 51 determines that the data corresponding to the first domain name are hot data. In order to avoid repeatedly acquiring the data corresponding to the first domain name from a network side, the processor 51 may determine the data corresponding to the first domain name to be stored in the first switching equipment, according to a type and characteristics of data cached in the switching equipment managed by the controller.

Certainly, the predetermined cache policy of the processor 51 varies with conditions. For example, the processor 51 may decide, according to a requirement of a content service provider, that the data corresponding to the first domain name is to be cached in the first switching equipment. A type of the policy, according to which the processor 51 decides that the data corresponding to the first domain name are to be cached in the first switching equipment, is not particularly limited in the embodiment of the application.

The sender 52 is adapted to receive from the processor 51 the message that the first switching equipment is to cache the data requested by the first data packet; notify the first switching equipment to cache the data requested by the first data packet; and notify the first switching equipment to establish a first flow table entry according to issued match information corresponding to the first data packet and issued action instruction information corresponding to the first data packet, where the action instruction information corresponding to the first data packet is adapted to instruct the first switching equipment to forward the data cached in the first switching equipment and requested by the first data packet.

The sender 52 may send a flow table establishment instruction message to the first switching equipment. The flow table establishment instruction message is adapted to instruct the first switching equipment to establish the first flow table entry according to the match information corresponding to the first data packet and the action instruction information corresponding to the first data packet, where the match information and the action instruction information are carried in the flow table establishment instruction message. In addition, the flow table establishment instruction message is also adapted to instruct the first switching equipment to cache the data requested by the first data packet.

The sender 52 may also send a first instruction message to the first switching equipment, to instruct the first switching equipment to cache the data requested by the first data packet. In addition, the controller may send a flow table establishment instruction message, adapted to instruct the first switching equipment to establish the first flow table entry according to the match information corresponding to the first data packet and the action instruction information corresponding to the first data packet, where the match information and the action instruction information are carried in the flow table establishment instruction message.

After the processor 51 determines the data requested by the first data packet to be cached into the first switching equipment, an interaction between the controller 50 and the first switching equipment is not particularly limited in the embodiment. A final result of the interactions is adapted to establish a first flow table entry and instruct the first switching equipment to cache the data requested by the first data packet. Thus, the network device may acquire the data corresponding to the first data packet directly from the first switching equipment.

Figure 6:
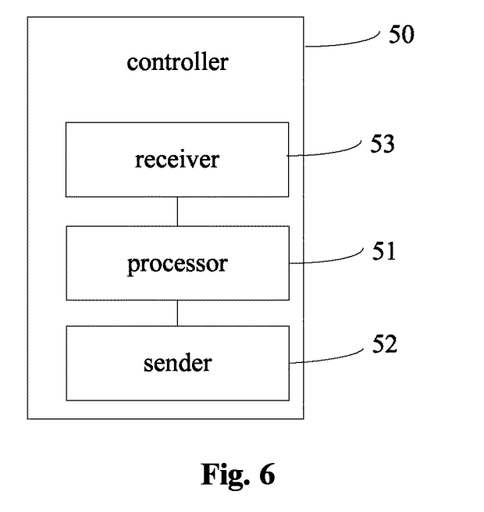
FIG. 6 is a structural diagram of another controller according to an embodiment of the application.

Optionally, as shown in FIG. 6, the controller 50 may further include a receiver 53.

The receiver 53 is adapted to receive the first data packet forwarded by the first switching equipment and send the first data packet to the processor 51, before the processor 51 determines that the first switching equipment is to cache the data requested by the first data packet.

The processor 51 adapted to determine that a first switching equipment is to cache data requested by a first data packet, includes:
   determining, by the processor 51, that the first switching equipment is to cache data requested by a first data packet, according to a cache policy corresponding to the first data packet, where the cache policy is pre-configured in the controller or is acquired from a policy and charging control PCC device.

For example, when the user requests an access of a data packet corresponding to a first domain name multiple times through a first switching equipment, the first switching equipment sends the packet to the controller, and then the processor 51 determines that the data corresponding to the first domain name are hot data. In order to avoid repeatedly acquiring the data corresponding to the first domain name from a network side, the processor 51 may determine that the data corresponding to the first domain name is to be stored in the first switching equipment, according to a type and characteristics of data cached in the switching equipment managed by the controller.

Certainly, the predetermined cache policy of the processor 51 varies with conditions. For example, the processor 51 may decide, according to a requirement of a content service provider, that the data corresponding to the first domain name is to be cached in the first switching equipment. A type of the policy, according to which the processor 51 decides that the data corresponding to the first domain name are to be cached in the first switching equipment, is not particularly limited in the embodiment of the application.

Optionally, the receiver 53 is further adapted to receive a second data packet forwarded by a second switching equipment.

The receiver 52 is further adapted to notify the second switching equipment to forward the second data packet to the first switching equipment, in the case that data requested by the second data packet is the same as the data requested by the first data packet.

Thus, after receiving the second data packet sent by the second switching equipment, the first switching equipment can directly send the data requested by the second data packet to the second switching equipment. Thus, the controller 50 provides an optimized routing path to the first switching equipment, to improve a speed of the network device accessing the data.

Optionally, after the controller receives a second data packet forwarded by a second switching equipment, the sender 52 is further adapted to notify the second switching equipment to cache the data requested by the second data packet, and notify the second switching equipment to establish a second flow table entry according to issued match information corresponding to the second data packet and issued action instruction information corresponding to the second data packet, where the action instruction information corresponding to the second data packet is adapted to instruct the second switching equipment to forward the data cached in the second switching equipment and requested by the second data packet.

Because the data corresponding to the second data packet are cached in the second switching equipment, the first switching equipment can directly send the data to the network device, rather than obtaining the data from a server corresponding to the second data packet through multiple times of routing, when the network device requests to the second switching equipment the data corresponding to the second data packet. Therefore, a speed of the user accessing network data is improved, and the network congestion is eased to some extent.

Based on the above description of the embodiment, a controller is provided in the embodiment. The controller includes a processor and a sender. The processor determines that a first switching equipment is to cache data requested by a first data packet. The sender notifies the first switching equipment to cache the data requested by the first data packet, and notifies the first switching equipment to establish a first flow table entry according to issued match information corresponding to the first data packet and issued action instruction information corresponding to the first data packet.

Thus, after receiving a notification from the controller, the first switching equipment establishes the first flow table entry according to the match information corresponding to the first data packet and the action instruction information corresponding to the first data packet, where the match information and the action instruction information are issued by the controller. The first switching equipment forwards the first data packet to a target network element corresponding to the first data packet. The target network element sends to the first switching equipment the data corresponding to the first data packet, and then the first switching equipment caches the received data corresponding to the first data packet. Because the data corresponding to the first data packet are cached in the first switching equipment, the first switching equipment can directly send the data to the user, rather than obtaining the data from a server corresponding to the first data packet through multiple times of routing, when a user requests the data corresponding to the first data packet. Therefore, a speed of the user accessing network data is improved, and the network congestion can be eased to some extent.

Fourth Embodiment

Figure 7:
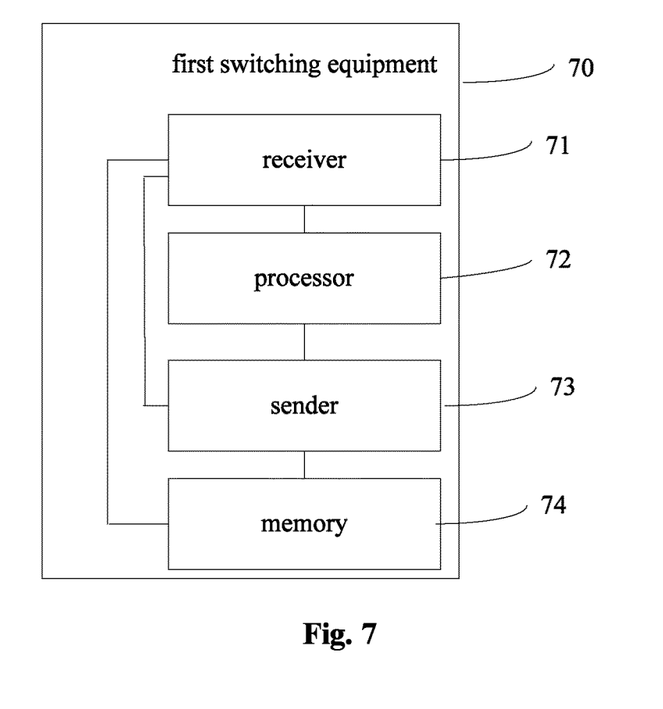
FIG. 7 is a structural diagram of first switching equipment according to an embodiment of the application.

A first switching equipment 70 is provided in the embodiment of the application, which is based on OpenFlow protocol. The first switching equipment 70 includes: a receiver 71, a processor 72, a sender 73 and a memory 74.

The receiver 71 is adapted to receive a first notification from a controller, and send the first notification to the processor 72, where the first notification is adapted to instruct the first switching equipment to cache data requested by a first data packet, and instruct the first switching equipment to establish a first flow table entry according to issued match information corresponding to the first data packet and issued action instruction information corresponding to the first data packet, where the action instruction information corresponding to the first data packet is adapted to instruct the first switching equipment to forward the data cached in the first switching equipment and requested by the first data packet.

The receiver 71 of the first switching equipment 70 may receive a first notification from the controller, in a case that the controller determines, according to a predetermined cache policy, that a first switching equipment is to cache data requested by a first data packet.

For example, when the user requests an access of a data corresponding to a first data packet multiple times through a first switching equipment 70, the first switching equipment 70 sends the packet to the controller; and then the controller determines that the data corresponding to the first domain name are hot data. In order to avoid repeatedly acquiring the data corresponding to the first domain name from a network side, the controller may determine the data corresponding to the first domain name to be stored in the first switching equipment, according to a type and characteristics of data cached in the first switching equipment.

Certainly, the predetermined cache policy varies with conditions. For example, the controller may decide, according to a requirement of a content service provider, that the data corresponding to the first domain name is to be cached in the first switching equipment. A type of the policy, according to which the controller decides that the data corresponding to the first domain name is to be cached in the first switching equipment, is not particularly limited in the embodiment of the application.

It is noted that the first notification is merely a reference different from a second notification, which is merely to explain that the first notification and the second notification are different notifications issued by the controller.

The processor 72 is adapted to receive the first notification sent by the receiver 71, and establish the first flow table entry according to the match information corresponding to the first data packet and the action instruction information corresponding to the first data packet, where the match information and the action instruction information are issued by the controller.

The sender 73 is adapted to forward the first data packet to a target network element corresponding to the first data packet.

The data requested by the first data packet are stored in the target network element. The target network element may be a subscriber server, or any other switching equipment managed by the controller, which will not be limited in the embodiment of the application.

The receiver 71 is further adapted to receive data corresponding to the first data packet, where the data is returned by the target network element corresponding to the first data packet; and send to the memory 74 the data corresponding to the first data packet.

The memory 74 is adapted to receive the data corresponding to the first data packet and sent by the receiver 71, and cache the received data corresponding to the first data packet.

The memory 74 caches the received data corresponding to the first data packet. Thus, a network device can acquire the data corresponding to the first data packet directly from the first switching equipment. Therefore, a speed of the user accessing a network is improved, and the network congestion is reduced.

Optionally, the receiver 71 is further adapted to receive the first data packet, before receiving the first notification from the controller.

After receiving the first data packet initiated by the network device, the first switching equipment 70 matches the first data packet to a match field of the flow table entry. If there is match information, it means that a flow table entry corresponding to the first data packet exists in the first switching equipment. In this case, data in the first switching equipment 70 and requested by the first data packet is sent to the network device.

If there is no match information, it means flow table entry corresponding to the first data packet does not exist in the first switching equipment. In this case, the requested data needs to be acquired from another target network element.

The sender 73 is further adapted to forward the first data packet to the controller, in the case that the flow table entry corresponding to the first data packet does not exist in the first switching equipment.

Because the flow table entry corresponding to the first data packet does not exist in the first switching equipment 70, the sender 73 forwards the first data packet to the controller, and thus the processor can process the data packet, such as whether to select an appropriate routing path for the data request packet, or determining whether to cache the data requested by the first data packet into the first switching equipment.

Optionally, the receiver 71 is further adapted to receive a second data packet sent by a network device.

The sender 73 is further adapted to forward to the network device cached data corresponding to the second data packet, in the case that a flow table entry corresponding to the second data packet exists in the first switching equipment.

Optionally, after the receiver receives the second data packet sent by the network device, the sender 73 is further adapted to send the second data packet to the controller, in the case that the flow table entry corresponding to the second data packet does not exist in the first switching equipment.

Because the flow table entry corresponding to the second data packet does not exist in the first switching equipment 70, the first switching equipment 70 should send the second data packet to the controller. The controller determines a source of the data requested by the second data packet and determines whether the data requested by the second data packet is to be cached in the first switching equipment 70. If the data requested by the second data packet exists in a switching equipment managed by the controller, then the first switching equipment 70 requests the data corresponding to the second data packet from the switching equipment. If the data requested by the second data packet does not exist in any switching equipment managed by the controller, the first switching equipment 70 requests the required data from a corresponding server. In the case that the data requested by the second data packet are cached in a second switching equipment managed by the controller, and the controller does not determine the data requested by the second data packet to be cached in the first switching equipment 70, the receiver 71 is further adapted to receive a second notification from the controller, and send the second notification to the sender 73, where the second notification is adapted to instruct the first switching equipment to forward the second data packet to a second switching equipment, and where data corresponding to the second data packet is cached in the second switching equipment.

The sender 73 is further adapted to receive the second notification sent by the receiver 71, and send the second data packet to the second switching equipment according to the second notification.

The receiver 71 is further adapted to receive the data corresponding to the second notification and sent by the second switching equipment, and send to the sender 73 the data corresponding to the second data packet.

The sender 73 is further adapted to receive the data corresponding to the second data packet and sent by the receiver 71, and forward the received data corresponding to the second data packet to the network device.

Optionally, the second notification is further adapted to instruct the first switching equipment to cache data requested by the second data packet; and establish a third flow table entry according to match information corresponding to the second data packet and action instruction information corresponding to the second data packet, where the action instruction information corresponding to the second data packet is adapted to instruct the second switching equipment to forward the data cached in the second switching equipment and requested by the second data packet.

The memory 74 is further adapted to cache the data corresponding to the second data packet, after the receiver 71 receives the data corresponding to the second data packet and sent by the second switching equipment.

The controller can decide that the data requested by the second data packet is to be cached in the first switching equipment 70, according to a cache policy. Thus, when a second access request accesses the first switching equipment 70, the first switching equipment 70 can directly send the data to the network device, rather than obtaining the data from the server corresponding to the second data packet through multiple times of routing. Therefore, a speed of the user accessing network data is improved, and the network congestion can be eased to some extent.

Based on the above description of the embodiment, a first switching equipment is provided according to embodiments of the application. The first switching equipment includes a receiver, a processor, a sender and a memory. The controller determines that the first switching equipment is to cache the data requested by the first data packet, according to a predetermined policy. Therefore, after the receiver receives the first notification from the controller, the processor establishes the first flow table entry according to the match information corresponding to the first data packet and the action instruction information corresponding to the first data packet, where the match information and the action instruction information are issued by the controller. The sender forwards the first data packet to a network element corresponding to the first data packet. The receiver receives data corresponding to the first data packet, where the data is returned by the target network element corresponding to the first data packet. The memory caches the received data corresponding to the first data packet. Thus, if a network device requests an access of the data corresponding to the first data packet through the first switching equipment, the processor determines a flow table corresponding to the first domain name, and then the sender can directly send the data corresponding to the first data packet to the network device. Therefore, a speed of the user accessing network data is improved, and the network congestion can be eased to some extent.

Those skilled in the art can understand that all or a few of the steps in the method embodiments can be accomplished by hardware related to program instructions. The aforesaid program may be stored in a computer readable storage medium. When the program is executed, the steps of the above method embodiments are included in what are executed. The aforesaid storage medium includes: a ROM, a RAM, a magnetic disk or a CD.

The described above are merely particular embodiments of the application. However, a protection scope of the application is not limited to the particular embodiments. Any modification or substitution within the technical scope disclosed in the application and obvious to those skilled in the art is covered within the protection scope of the application. Therefore, the protection scope of the application shall be as the protection scope in the appended claims.

What is claimed is:

1. A network storage method, applicable to a first switching equipment based on an OpenFlow protocol, comprising:

receiving, by the first switching equipment, a first data packet;

receiving, a first notification from a controller, wherein the first notification is used to instruct the first switching equipment to cache data requested by the first data packet, and instruct the first switching equipment to establish a first flow table entry according to issued match information associated with the first data packet and issued action instruction information associated with the first data packet, wherein the action instruction information associated with the first data packet is used to instruct the first switching equipment to forward the data cached in the first switching equipment and requested by the first data packet;

establishing the first flow table entry according to the match information associated with the first data packet and the action instruction information associated with the first data packet, wherein the match information and the action instruction information are issued by the controller;

forwarding the first data packet to a target network element associated with the first data packet;

receiving data associated with the first data packet, wherein the data associated with the first data packet is returned by the target network element associated with the first data packet;

caching the received data associated with the first data packet;

receiving a second data packet sent by a network device;

forwarding cached data associated with the second data packet to the network device, in a case that a flow table entry associated with the second data packet exists in the first switching equipment;

after receiving the second data packet sent by the network device, sending the second data packet to the controller, in a case that the flow table entry associated with the second data packet does not exist in the first switching equipment;

receiving a second notification from the controller, wherein the second notification is adapted to instruct the first switching equipment to forward the second data packet to a second switching equipment, wherein the data associated with the second data packet is cached in the second switching equipment;

sending the second data packet to the second switching equipment according to the second notification;

receiving the data associated with the second data packet and sent by the second switching equipment;

forwarding the received data associated with the second data packet to the network device; wherein the second notification is further used to instruct the first switching equipment to cache data requested by the second data packet, and instruct the first switching equipment to establish a second flow table entry according to match information associated with the second data packet and action instruction information associated with the second data packet, wherein the action instruction information associated with the second data packet is used to instruct the second switching equipment to forward the data cached in the second switching equipment and requested by the second data packet;

caching the data associated with the second data packet, after receiving the data associated with the second data packet and sent by the second switching equipment;

forwarding, by the first switching equipment, cached data associated with the second data packet to the network device, in a case that the flow table entry corresponding to the second data packet exists in the first switching equipment;

wherein after the receiving, by the first switching equipment, the second data packet sent by the network device, sending, by the first switching equipment, the second data packet to the controller, in a case that the flow table entry associated with the second data packet does not exist in the first switching equipment;

sending, by the first switching equipment, the second data packet to the second switching equipment according to the second notification, wherein the second notification is adapted to instruct the first switching equipment to forward the second data packet to the second switching equipment, and wherein the data associated with the second data packet is cached in the second switching equipment;

receiving, by the first switching equipment, the data associated with the second data packet and sent by the second switching equipment; and forwarding, by the first switching equipment, the received data associated with the second data packet to the network device.

2. The method according to claim 1, wherein before receiving, by the first switching equipment, the first notification from the controller, the method further comprises:

forwarding, by the first switching equipment, the first data packet to the controller, in a case that a flow table entry associated with the first data packet does not exist in the first switching equipment.

3. A non-transitory computer storage medium comprising computer executable instructions, which when executed cause a processor of a first switching equipment to implement the following operations based on an OpenFlow protocol:

receive a first data packet;

receive, a first notification from a controller, wherein the first notification is used to cache data requested by the first data packet, and to establish a first flow table entry according to issued match information associated with the first data packet and issued action instruction information associated with the first data packet, wherein the action instruction information associated with the first data packet is used forward the data cached and requested by the first data packet;

establish the first flow table entry according to the match information associated with the first data packet and the action instruction information associated with the first data packet, wherein the match information and the action instruction information are issued by the controller;

forward the first data packet to a target network element associated with the first data packet;

receive data associated with the first data packet, wherein the data associated with the first data packet is returned by the target network element associated with the first data packet;

cache the received data associated with the first data packet;

receive a second data packet sent by a network device;

forward cached data associated with the second data packet to the network device, in a case that a flow table entry associated with the second data packet exists;

after receipt of the second data packet sent by the network device, send the second data packet to the controller, in a case that the flow table entry associated with the second data packet does not exist;

receive a second notification from the controller, wherein the second notification is adapted to cause the second data packet to be forwarded to a second switching equipment, wherein the data associated with the second data packet is cached in the second switching equipment;

send the second data packet to the second switching equipment according to the second notification;

receive the data associated with the second data packet and sent by the second switching equipment;

forward the received data associated with the second data packet to the network device, wherein the second notification is further used to cache data requested by the second data packet, and to establish a second flow table entry according to match information associated with the second data packet and action instruction information associated with the second data packet, wherein the action instruction information associated with the second data packet is used to instruct the second switching equipment to forward the data cached in the second switching equipment and requested by the second data packet;

cache the data associated with the second data packet, after receiving the data associated with the second data packet and sent by the second switching equipment;

forward cached data associated with the second data packet to the network device, in a case that the flow table entry corresponding to the second data packet exists;

wherein after the receipt of the second data packet sent by the network device,
send the second data packet to the controller in a case that the flow table entry associated with the second data packet does not exist;
send the second data packet to the second switching equipment according to the second notification, wherein the second notification is for use in forwarding the second data packet to the second switching equipment, and wherein the data associated with the second data packet is cached in the second switching equipment;
receive the data associated with the second data packet and sent by the second switching equipment; and
forward the received data associated with the second data packet to the network device.

4. The non-transitory computer storage medium of claim 3, including instruction for execution by the processor of the first switching equipment, wherein before receiving the first notification from the controller, the processor implements the following operation:
forwarding the first data packet to the controller in a case that a flow table entry associated with the first data packet does not exist in the first switching equipment.

* * * * *